(12) United States Patent
Cristina et al.

(10) Patent No.: US 10,859,123 B2
(45) Date of Patent: Dec. 8, 2020

(54) TORQUE-LIMITING DEVICE

(71) Applicant: Microtecnica S.r.l., Turin (IT)

(72) Inventors: Concetto Cristina, Turin (IT); Marco Gianfranceschi, Turin (IT)

(73) Assignee: MICROTECNICA S.R.L., Turin (IT)

( * ) Notice: Subject to any disclaimer, the term of this patent is extended or adjusted under 35 U.S.C. 154(b) by 64 days.

(21) Appl. No.: 16/002,724

(22) Filed: Jun. 7, 2018

(65) Prior Publication Data

US 2018/0355921 A1    Dec. 13, 2018

(30) Foreign Application Priority Data

Jun. 7, 2017  (EP) ..................................... 17174822

(51) Int. Cl.
| | | |
|---|---|---|
| *F16D 7/00* | (2006.01) | |
| *B64C 13/28* | (2006.01) | |
| *F16D 7/10* | (2006.01) | |
| *F16D 49/02* | (2006.01) | |

(52) U.S. Cl.
CPC .............. *F16D 7/005* (2013.01); *B64C 13/28* (2013.01); *F16D 7/10* (2013.01); *F16D 49/02* (2013.01)

(58) Field of Classification Search
CPC ... F16D 7/044; F16D 7/06; F16D 7/08; F16D 7/005; F16D 43/20; F16D 43/2022; F16D 43/2024; F16D 43/202; F16D 43/204; F16D 43/206; F16D 49/02; F16D 67/00; F16D 67/02; B64C 13/28
See application file for complete search history.

(56) References Cited

U.S. PATENT DOCUMENTS

| | | | |
|---|---|---|---|
| 3,542,162 A | 11/1970 | Kerr et al. | |
| 4,579,201 A * | 4/1986 | Tiedeman | ................. F16D 7/08 192/223.4 |
| 6,202,803 B1 | 3/2001 | Lang | |

FOREIGN PATENT DOCUMENTS

WO    9918367 A1    4/1999

OTHER PUBLICATIONS

European Search Report for application No. 17174822.1-1754 dated Oct. 13, 2017, 6 pages.

* cited by examiner

*Primary Examiner* — Charles A Fox
*Assistant Examiner* — Lori Wu
(74) *Attorney, Agent, or Firm* — Cantor Colburn LLP (57) ABSTRACT

An actuator comprises an input shaft, a sliding collar arranged around the input shaft, and an output shaft. The input shaft, output shaft and sliding collar are arranged such that a torque applied to the input shaft can be transmitted via the sliding collar to the output shaft. The actuator comprises a torque-limiting device for limiting the transmission of torque between the input shaft and the output shaft if the torque exceeds a certain threshold. The torque-limiting device comprises one or more rolling elements arranged between the sliding collar and the input shaft to allow the sliding collar to move axially relative to the input shaft and engage with or disengage from the output shaft.

12 Claims, 9 Drawing Sheets

TORQUE-LIMITING DEVICE

FOREIGN PRIORITY

This application claims priority to European Patent Application No. 17174822.1 filed Jun. 7, 2017, the entire contents of which is incorporated herein by reference.

FIELD OF THE INVENTION

The present invention relates to the field of torque-limiting devices (torque limiters), for use, for example, in linear actuators.

BACKGROUND

Actuation systems, such as those used in aircraft, contain actuators with torque-limiting devices. The actuation systems transfer torque from an input shaft to an output shaft in order to actuate moveable components, such as flaps or slats on aircraft wings, for example. In some actuation systems, a no-back device is used in addition to the torque limiter.

The no-back devices provided in such actuators act to prevent an external torque applied to the output shaft (e.g. from external forces such as airload acting on a flap or slat) from being transferred back to the input shaft. This is important if, for example, a disconnection failure occurs in the actuation system, as the no-back device can prevent a loss of position control of a component (e.g. flap or slat) by grounding any resultant torque acting on the component (e.g. an airload) to a structural ground and thereby locking the component in a fixed position.

The torque-limiting devices provided in such actuators act to prevent excessive torque (mechanical overload, e.g. from a structural jam) from the input shaft being transmitted to the output shaft and other components (e.g. flaps or slats), which could potentially damage them. Torque-limiting devices may limit the torque in various ways. One way in which torque-limiting devices may work is, when the input torque exceeds a certain preload (or "activation threshold"), a sliding collar provided between the input shaft and the output shaft will slip, thereby grounding the torque inside the actuator. In order to release the torque limiting device, a command in the opposite direction must be provided.

Typically, both the no-back and the torque-limiting functions are provided in a single assembly (e.g. in the so-called "torque limiting/no back" assembly).

The inventors of the present invention believe that there is scope for improvement in such torque-limiting devices.

SUMMARY

According to a first aspect of the invention, there is provided an actuator comprising an input shaft, a sliding collar arranged around the input shaft, and an output shaft, the input and output shafts and sliding collar being arranged such that a torque applied to the input shaft can be transmitted via the sliding collar to the output shaft, the actuator comprising a torque-limiting device for limiting the transmission of torque between the input shaft and the output shaft if the torque exceeds a certain threshold, wherein the torque-limiting device comprises one or more rolling elements arranged between the sliding collar and the input shaft to allow the sliding collar to move axially relative to the input shaft and engage with or disengage from the output shaft.

In known torque limiters it can be difficult to correctly set the activation torque to protect downstream parts of the actuator from overloads, while preventing nuisance (unwanted) activations of the torque limiter under normal operating conditions. The torque limiter activation setting must take into account the possible variations of efficiency and drag torques of internal components of the actuator, which are mainly due to the ambient temperature at which the actuator operates (lower temperatures result in lower overall efficiency). In addition, the load/torque rate on the output, which depends on the structural stiffness, could have an influence on the torque limiter trip value (activation setting). These effects can cause the difference between the minimum and maximum torque limiter engagement threshold to be quite high. The actuator design should therefore take that threshold variation into account for sizing all its internal components, as reducing the difference between the minimum and maximum torque-limiter intervention thresholds can reduce the overall dimensions of the actuator, thereby saving weight.

The behaviour and performance of prior art torque-limiting devices depend mainly on two major sliding friction contributions: 1) between helical ramps provided on the sliding collar and the free (output) shaft; and 2) between a spline coupling of the sliding collar and the input shaft.

The coefficients of friction between these two pairs of components are the main contributors to the threshold between the minimum and maximum torque-limiter engagement, and contribute greatly to the output stiffness dependency.

However, in the present invention, the sliding friction in contribution 2) is replaced with rolling friction by providing one or more rolling elements arranged between the input shaft and the sliding collar.

By "rolling element" is meant an element capable of rolling (e.g. around at least one axis of the rolling element) between the sliding collar and the input shaft.

By providing such rolling elements between the input shaft and the sliding collar, the coefficient of friction between the sliding collar and the input shaft is reduced. This is beneficial as is makes the torque-limiter insensitive (or much less sensitive) to load/torque rate changes at the output of the actuator.

The one or more rolling elements are preferably capable of rolling (or arranged such that they can roll) in an axial direction with respect to the input shaft and sliding collar.

Preferably, the one or more rolling elements are in contact (optionally via another material such as a lubricant, e.g. grease) with both the input shaft and the sliding collar. Thus, as the sliding collar is made to move in an axial direction, the rolling elements may roll (axially) along the input shaft.

Preferably the one or more rolling elements are spherical, e.g. balls.

In one embodiment, the one or more rolling elements have a diameter of 4 mm. However, rolling elements with different diameters may also be used. For example, the diameter of the rolling element(s) may be in a range of 2-10 mm, depending on the size of the device, for example. The diameter may depend on the pressure resulting from the anticipated load on the rolling element. Preferably, all of the one or more rolling elements have the same diameter.

The rolling elements may be made of metal, e.g. steel.

The input shaft and/or the sliding collar (and preferably both) preferably comprises one or more (preferably more than one), preferably longitudinal (axial) pits or grooves, which are provided along at least part of the length of the input shaft, and (partially) within which the one or more rolling elements are arranged. By providing such pits or grooves, this can help hold the one or more spherical elements in their desired positions.

Preferably, more than one pit or groove is provided on (each of) the input shaft and/or sliding collar. For example, 2, 3 or, preferably, 4-20 pits or grooves may be provided on (each of) the input shaft and/or sliding collar. In one embodiment, ten pits or grooves are provided on (each of) the input shaft and/or sliding collar.

Preferably, the pits or grooves are spaced evenly around the circumference of the input shaft and/or around the inner surface of the sliding collar. Alternatively, the pits or grooves may be provided in two or more groups or clusters around the circumference of the input shaft and/or around the inner surface of the sliding collar. For example, the input shaft and/or sliding collar may (each) comprise ten pits or grooves, arranged circumferentially around the input shaft and/or sliding collar in, e.g., two groups of five pits or grooves.

The one or more rolling elements are preferably dimensioned so as to fit, or partially fit, in the one or more pits or grooves; and/or the one or more pits or grooves are preferably dimensioned so as to receive, or partially receive, the one or more rolling elements.

In a preferred embodiment, the depth of each pit or groove is equal to the radius (or half the height) of the one or more rolling elements. However, the depth may be slightly more or slightly less than this. The depth of each pit or groove should not exceed the diameter (or height) of the one or more rolling elements, so that the one or more rolling elements may contact the sliding collar as well as the input shaft.

Preferably, each pit or groove has a radius of curvature equal to, or slightly larger than, that of the one or more rolling elements, so as to allow the one or more rolling elements to fit in and roll within each pit or groove.

The (axial) length of each pit or groove may depend on the number of rolling elements provided in each pit or groove. Preferably, all of the one or more pits or grooves have the same length. For example, the pits or grooves may have a length in a range from 10 to 40 mm long. In one embodiment, each pit or groove is 25 mm long.

Preferably, the same number of rolling elements is provided in each pit or groove.

Preferably, at least one, and preferably more than one, rolling element(s) is (are) provided in each pit or groove. For example, two to eight rolling elements may be provided in each pit or groove. In one embodiment, three rolling elements are provided in each pit or groove. Thus, in the case where there are ten pits or grooves, this would mean that there would be a total of thirty rolling elements provided.

The sliding collar preferably (also, i.e. in addition to the one or more pits or grooves on the input shaft) comprises one or more (preferably more than one), preferably longitudinal (axial) pits or grooves, which are provided along at least part of the (inside) length of the sliding collar, and (partially) within which the one or more rolling elements are arranged. By providing such pits or grooves on the sliding collar, as well as on the input shaft, this means that torque can be transmitted from the input shaft, through the one or more rolling elements, to the sliding collar (and then on to the output shaft).

Preferably, the one or more pits or grooves on the sliding collar are provided at position(s) corresponding to those of the one or more pits or grooves on the input shaft. Thus, for each pit or groove on the input shaft, a corresponding pit or groove on the sliding collar is also provided.

The one or more pits of grooves on the sliding collar may have the same dimensions and/or shape (e.g. length, depth and/or radius of curvature) as those of the input shaft (e.g. as described above). Alternatively, their dimensions and/or shape may differ (length, depth and/or radius of curvature).

A retaining member, e.g. a cage, may be provided around the input shaft and rolling elements, e.g. between the sliding collar and the rolling elements, to retain the rolling elements against the input shaft, e.g. within the one or more pits or grooves. The retaining member may be held in position, for example, with one or more resilient members, e.g. springs.

In a preferred embodiment, the retaining member is cylindrical, e.g. in the form of a cylindrical sleeve, and preferably has one or more apertures provided therein.

Preferably, the number of apertures in the retaining member equals or exceeds the number of rolling elements, e.g. there is at least one aperture provided for each rolling element. Preferably, an aperture is provided for each rolling element.

Preferably, the one or more apertures are positioned so as to hold the one or more rolling elements in the one or more pits or grooves. For example, preferably the apertures are arranged in rows corresponding to each pit or groove, each row preferably containing the same number of apertures (or more) as rolling elements provided in a pit or groove.

Preferably, the apertures are circular. Preferably, the radius of each aperture is slightly larger than the radius of each rolling element. This means that the apertures may act to retain the one or more rolling elements (e.g. axially) in the one or more pits or grooves.

Preferably, the cylindrical retaining member has a radius which is larger than that of the input shaft (e.g. at least along the length of which the one or more rolling elements and/or the one or more pits or grooves are provided), and also preferably less than that of the sliding collar. In this way, the retaining member may fit between the input shaft and the sliding collar.

Preferably, the retaining member is at least as long as the one or more pits or grooves.

The sliding collar and output shaft may each comprise one or more corresponding helical ramps. Such helical ramps may mate with each other, allowing torque to be transmitted from the sliding collar to the output shaft. Furthermore, the helical ramps can preferably cause a relative axial and radial motion between the sliding collar and the output shaft such that, when an input torque above a particular threshold is applied to the system, the sliding collar may disengage from the output shaft, thereby preventing the transmission of excessive torque to the output shaft. The angle of the helical ramps may be chosen so as to result in a desired torque at which the sliding collar and output shaft become disengaged, i.e. a desired activation torque of the torque limiting device.

During assembly of the actuator, a lubricant such as grease is preferably provided in each pit or groove, e.g. before the rolling elements (and retaining member) are installed therein. The lubricant (grease) can help to keep the rolling elements in the pits of grooves before a (the) retaining member is installed.

Preferably, the actuator further comprises a no-back device.

The present invention may be implemented in linear actuators.

The present invention may be implemented in aircraft, e.g. in aircraft actuation systems such as those for aircraft wing flaps and/or slats.

According to a further aspect of the invention, there is provided a method of manufacturing an actuator, the method comprising: providing an input shaft, a sliding collar, and an output shaft; positioning the sliding collar around the input shaft, and arranging the input and output shafts and sliding collar such that a torque applied to the input shaft can be transmitted via the sliding collar to the output shaft; the method further comprising providing a torque-limiting device for limiting the transmission of torque between the input shaft and the output shaft if the torque exceeds a certain threshold, wherein the torque-limiting device comprises one or more rolling elements arranged between the sliding collar and the input shaft to allow the sliding collar to move axially relative to the input shaft and engage with or disengage from the output shaft.

The actuator manufactured by this method may comprise any (or all) of the optional or preferred features described above.

The present invention, by replacing sliding with rolling friction as described above, can provide a torque-limiting device (or an actuator with a torque limiting device) that is insensitive (or much less sensitive) to external load/torque rate. Having a tighter threshold between the minimum and maximum torque-limiter engagement across the full temperature range highly reduces the risk of nuisance trips of the torque-limiter during the life of the actuator, which may be caused by efficiency variations. This may also have a positive impact (mainly weight reduction) on actuator parts sizing.

Furthermore, the low sensitivity to structural output stiffness (i.e. the overall stiffness of the load path that determines the load rate variation after a structural jam) can provide the possibility to set the torque-limiter activation threshold without having to take into account the external load/torque rate, which is one of the major issues with prior art torque-limiters. The spread reduction between the minimum and maximum torque-limiter trip setting is beneficial also in actuator acceptance tests, improving the FPY (First Pass Yield) and so reducing the actuator cost. In addition to that, the present invention may be quite easily applied to (used in) existing torque-limiter designs, for example, after the simple replacement of a few internal components.

BRIEF DESCRIPTION OF THE DRAWINGS

Preferred embodiments of the invention will now be described by way of example only and with reference to the accompanying drawings, in which.

DETAILED DESCRIPTION

Figure 1:
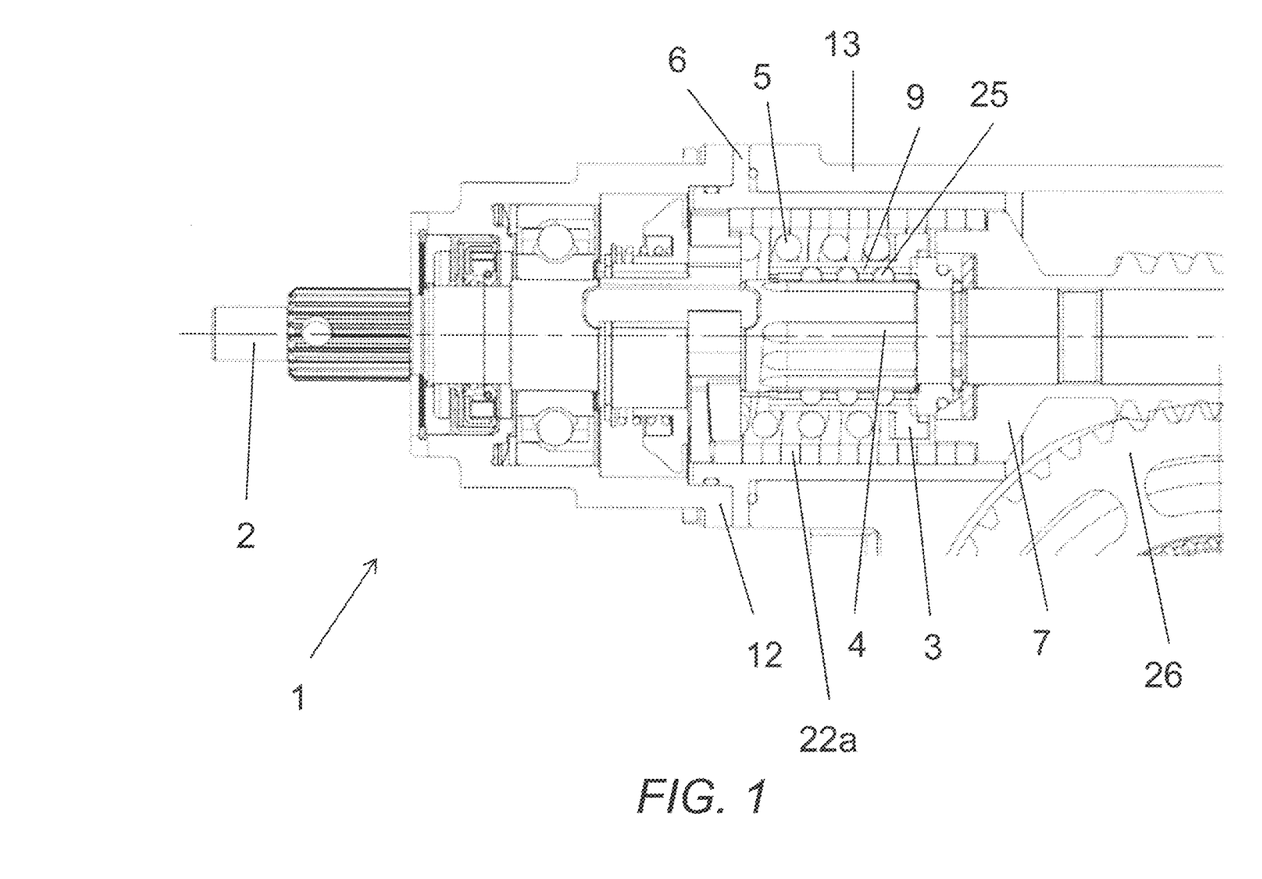
FIG. 1 is a cross-sectional view of part of an actuation system with an actuator according to an embodiment.
Figure 2:
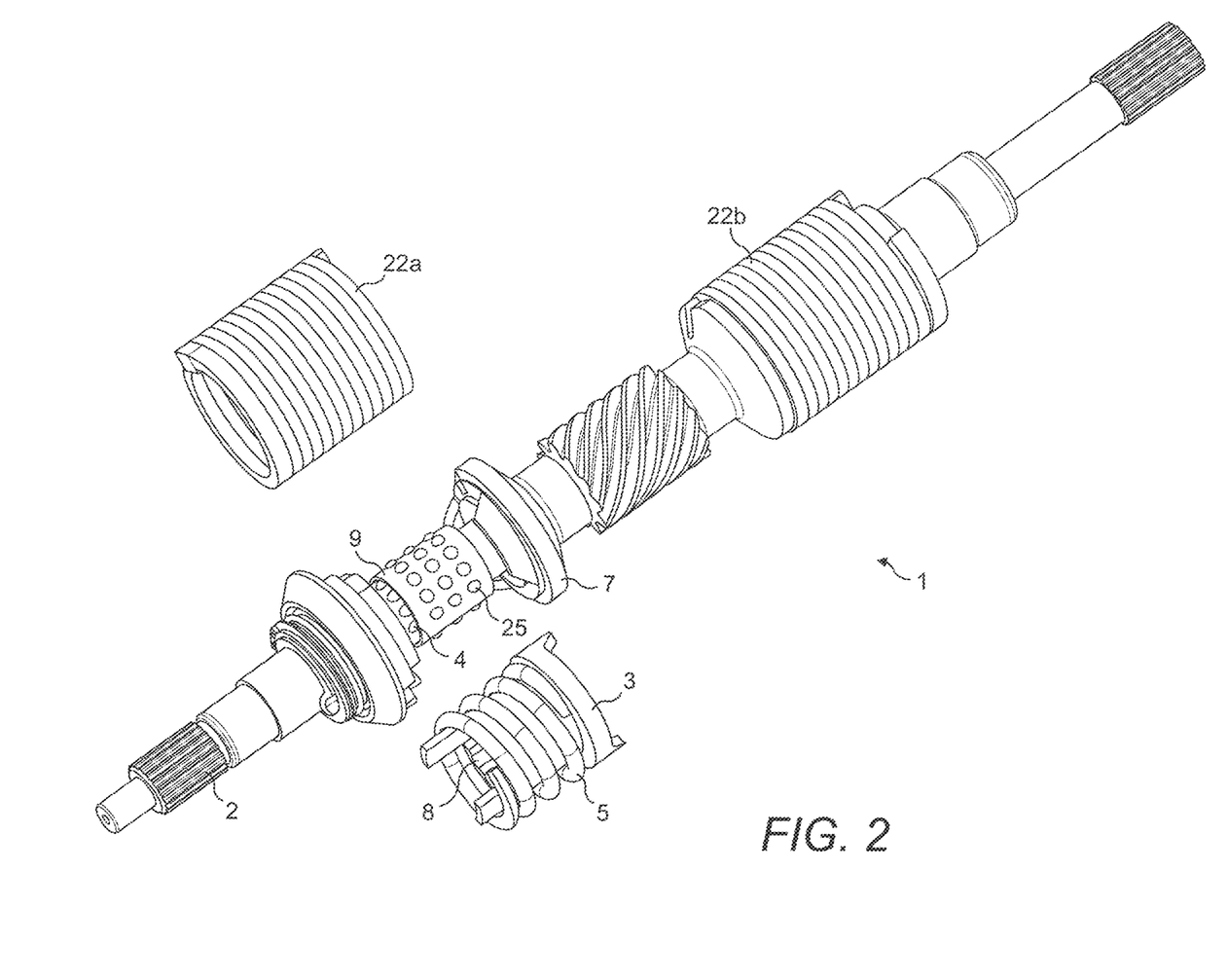
FIG. 2 is a partly exploded perspective view of part of an actuation system without its housings, with an actuator according to an embodiment.
Figure 10:
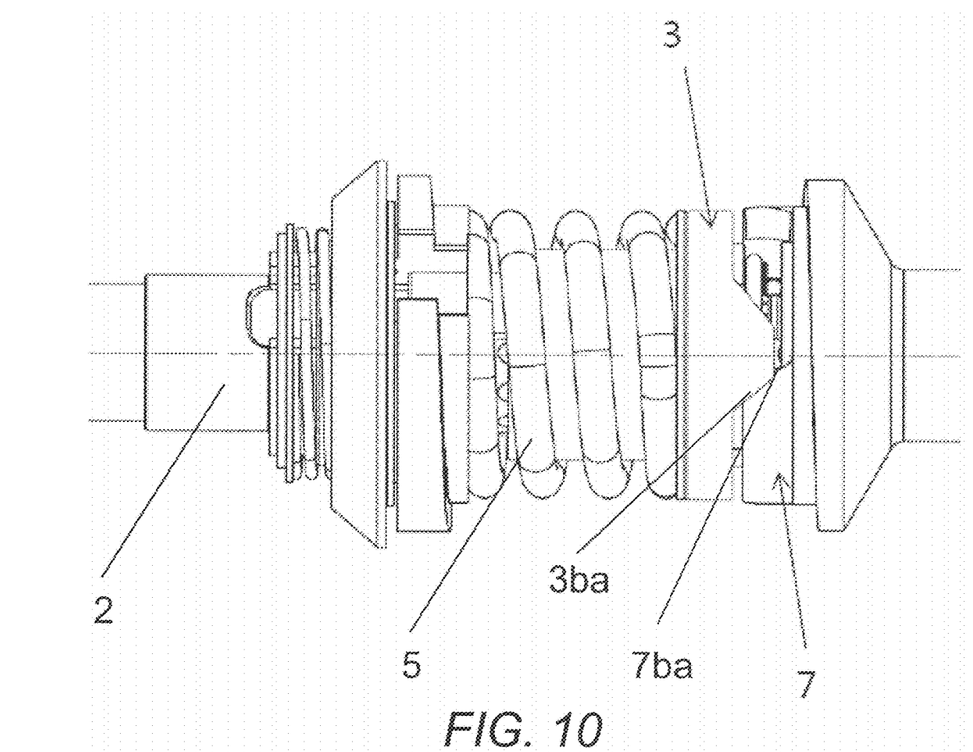
FIG. 10 is a side view illustrating how a sliding collar mates with an output shaft.
Figure 12:
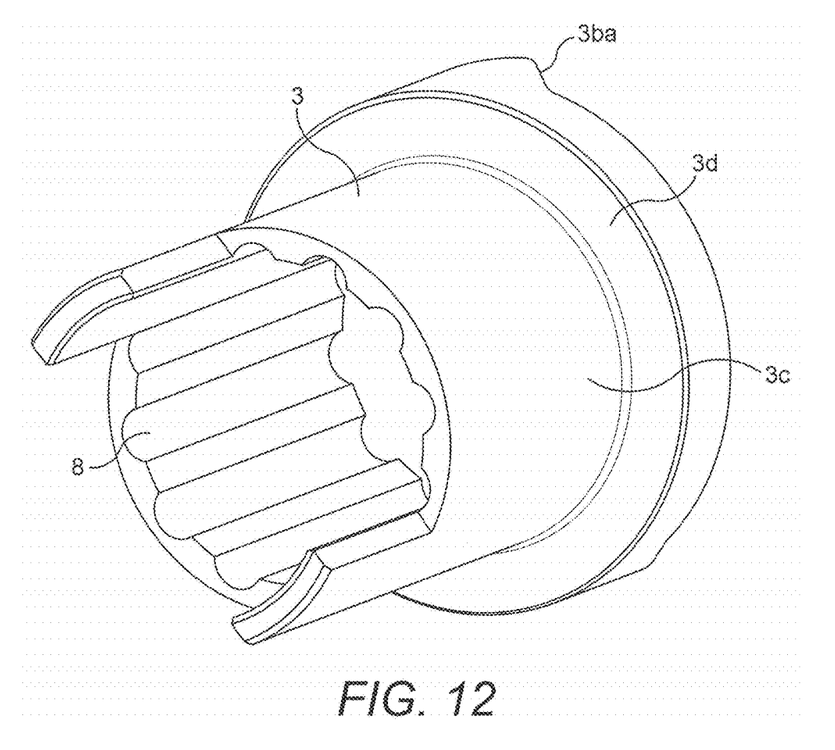
FIG. 12 is a part cut-away perspective view of a sliding collar according to an embodiment.

FIG. 1 is a cross-sectional view of part of an actuation system 1 comprising a linear actuator with a torque-limiting device according to an embodiment of the invention. FIG. 2 is a partly exploded perspective view of part of the actuation system 1 without its housings 6, 12, 13. FIG. 10 is a side view illustrating how a sliding collar 3 mates with an output shaft 7. FIG. 12 is a part cut-away perspective view of the sliding collar 3.

As shown in FIGS. 1, 2, 10 and 12, the actuation system 1 comprises an input shaft 2, a sliding collar 3 and an output shaft 7. The input shaft 2 is coupled to a power drive unit (not shown) which generates a torque to drive the input shaft 2. This torque is transmitted from the input shaft 2, through the sliding collar 3, to the output shaft 7, which then in turn uses the torque to move a further component (e.g. an aircraft wing flap or slat, not shown). These components are provided within housings 6, 12, 13.

The actuation system 1 comprises a torque-limiting device in the form of the sliding collar 3 with helical ramps 3ba and 3bb, which can mate with corresponding helical ramps 7ba and 7bb, respectively, provided on the output shaft 7. This is illustrated in FIG. 10, which shows a side view of part of the actuation system 1 with the helical ramp 3ba of the sliding collar 3 mating with the helical ramp 7ba of the output shaft 7. Ramps 3ba and 7ba mate when the input shaft 2 rotates in one rotational direction (clockwise) and ramps 3bb and 7bb mate when the input shaft 2 rotates in the opposite rotational direction (anti-clockwise).

A contrast spring 5 is installed in the actuator housings 6, 12, 13 around part 3c of the sliding collar 3 and mating against radially-extending surface 3d. The contrast spring 5 applies a force to the sliding collar 3, pushing its teeth 3a into engagement with the teeth 7a of the output shaft 7 (as discussed below).

Figure 9:
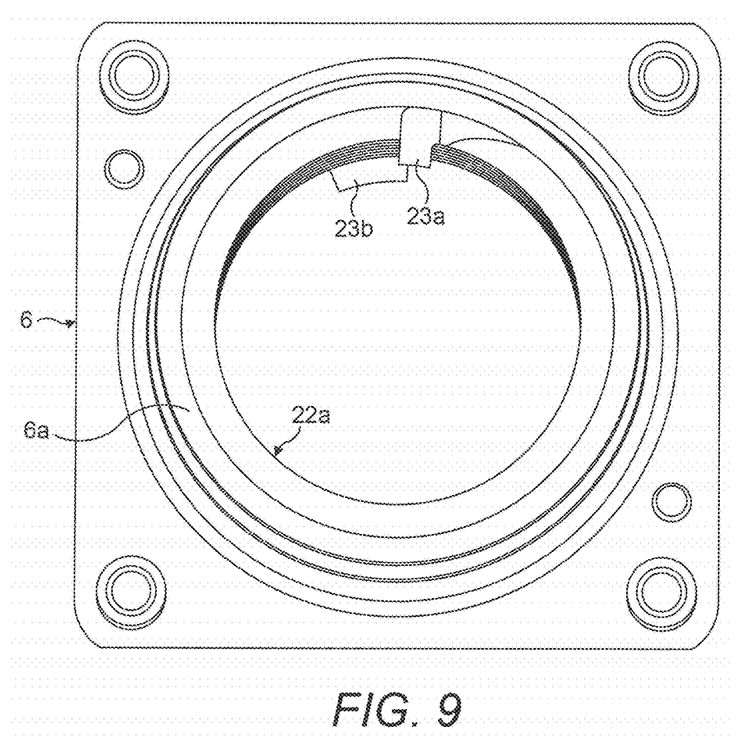
FIG. 9 is a cross-sectional view showing a no-back spring enlarged and locked within a housing.

A no-back spring 22a is provided around the contrast spring 5. A further no-back spring 22b is provided further along the output shaft 7, as shown in FIG. 2. The no-back springs 22a and 22b each have coils with a rectangular cross-section section. Each end of the springs 22a and 22b has a radially inwardly projecting tooth, 23a, 23b, as shown in FIG. 9.

In FIG. 2, the sliding collar 3, contrast spring 5 and their surrounding no-back spring 22a are shown in exploded view, so that the spherical elements 25 and cage 9 (described in more detail below) can be seen more clearly.

Figures 3A, 3B:
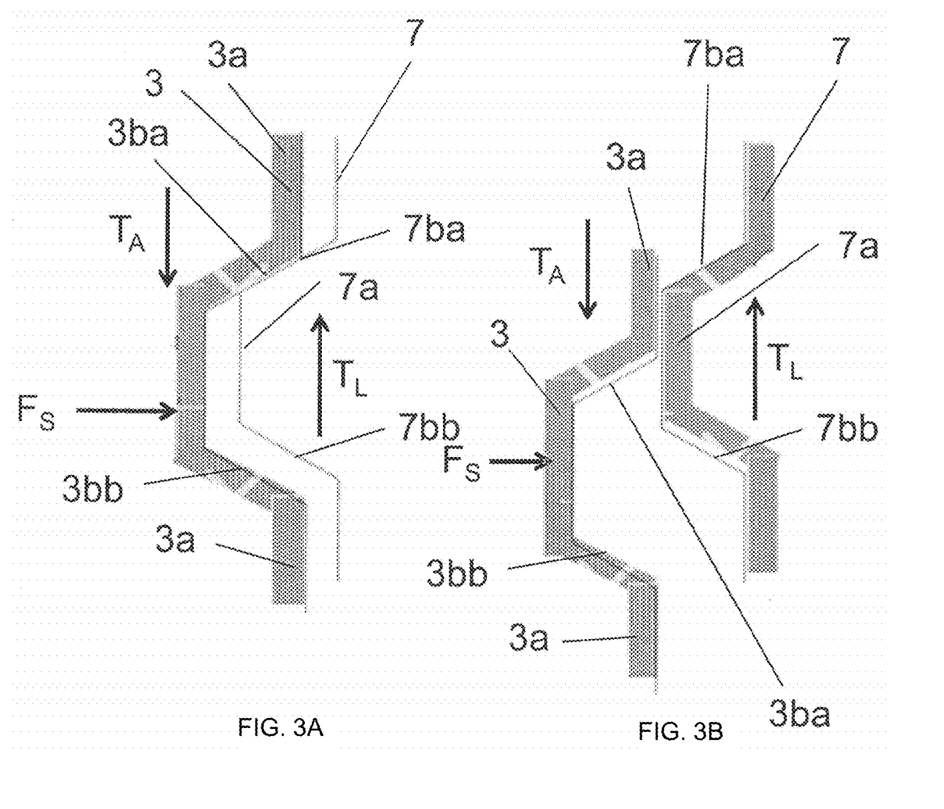
FIGS. 3A and 3B are schematic diagrams illustrating part of the functioning of the actuator.

The torque-limiting device in the form of the sliding collar 3 is arranged around the input shaft 2 such that it can transmit torque from the input shaft 2 to the output shaft 7 but prevent the transmission of excessive input torques (i.e. input torques above an activation threshold). This torque transmission process is illustrated schematically in FIG. 3 and described in more detail below.

Spherical (rolling) elements 25 are provided between the input shaft 2 and the sliding collar 3, and ten grooves 4 are provided along part of the length of the input shaft 2 to hold or receive the spherical elements 25.

Figure 11:
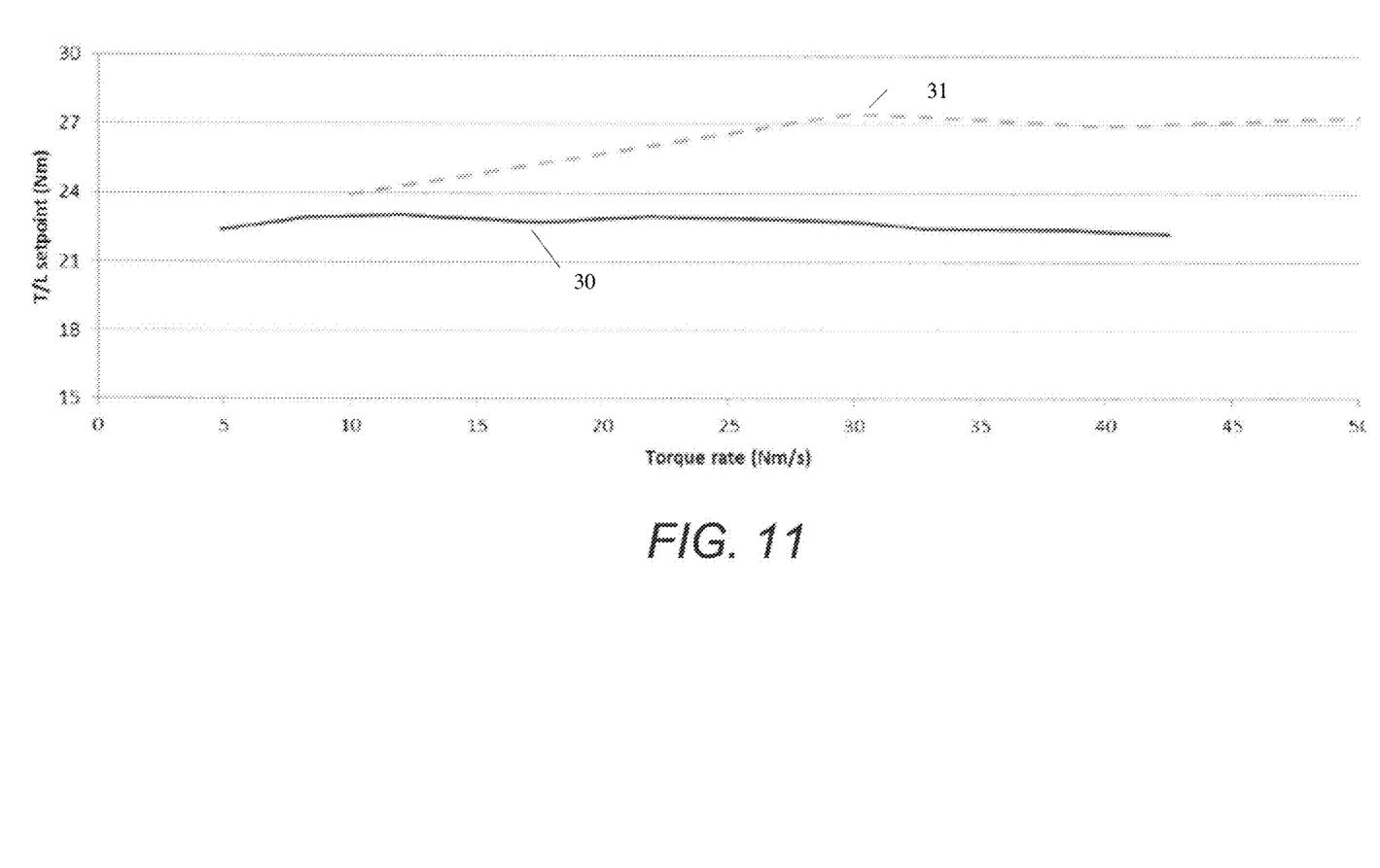
FIG. 11 is a graph comparing the performance of a torque-limiting device according to an embodiment with that of a prior art torque-limiting device.

As described above, by providing these spherical elements 25 between the input shaft 2 and the sliding collar 3, this reduces the friction between the sliding collar 3 and the input shaft 2, thereby improving the repeatability (reducing the variability) of the torque-limiter activation setting. This point is illustrated in FIG. 11, which is described below.

The ten grooves 4 are arranged circumferentially around the input shaft 2 in two groups of five grooves 4. Other numbers and/or groupings of grooves 4 are also possible. In an alternative embodiment, the grooves 4 are not grouped but are simply spaced evenly around the input shaft 2.

Figure 6:
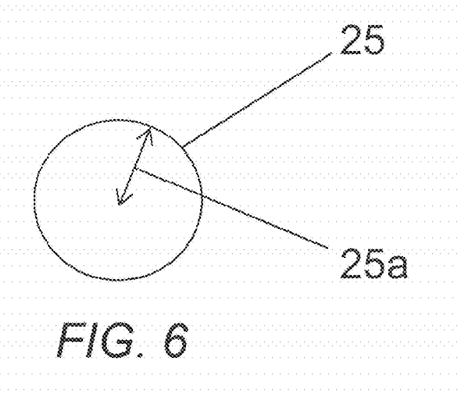
FIG. 6 is a cross-sectional view of a spherical element for use in an embodiment.
Figure 7:
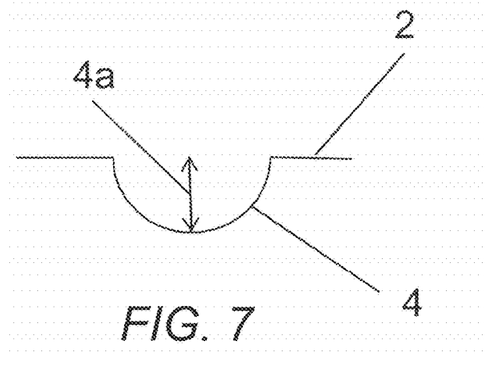
FIG. 7 is a cross-sectional view of part of an input shaft with a groove therein according to an embodiment.

The spherical elements 25 and grooves 4 are dimensioned so that the spherical elements 25 can partially fit in the grooves 4. The depth 4a of each groove 4 (as indicated in FIG. 7) is equal to the radius 25a (or half the height) of the one or more rolling elements 25 (as indicated in FIG. 6). However, in alternative embodiments, the depth 4a of each groove 4 is slightly more or slightly less than this.

Each groove 4 has a radius of curvature 4a which is equal to the radius 25a of the spherical elements 25.

Each groove 4 is 25 mm long and, in the embodiment shown, three spherical elements 25 are provided in each groove 4.

As illustrated in FIGS. 2 and 12, the sliding collar 3 also comprises ten grooves 8, which are provided along part of its inside length. These grooves 8 are provided at positions corresponding to those of the grooves 4 of the input shaft 2. Thus, the rolling elements 25 are located partially within both the grooves 4 of the input shaft 2 and the grooves 8 of the sliding collar 3. This arrangement allows for torque to be transmitted from the input shaft 2, through the one or more rolling elements 25, to the sliding collar 3.

The grooves 8 on the sliding collar 3 have the same dimensions and shape (i.e. length, depth and/or radius of curvature) as the grooves 4 of the input shaft 2 (i.e. as described above).

Figure 8:
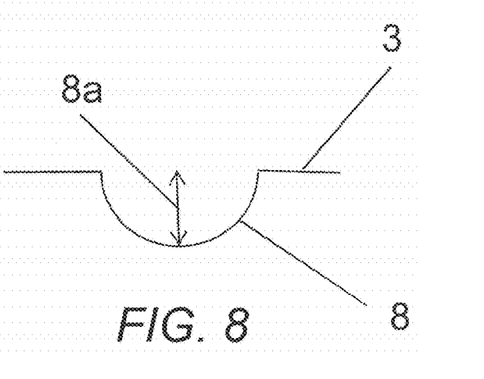
FIG. 8 is a cross-sectional view of part of an sliding collar with a groove therein according to an embodiment.

FIG. 8 illustrates the cross-section of such a groove 8 provided on an inner surface of the slighting collar 3. The groove 8 has a radius of curvature 8a.

The sliding collar 3 also has a radially projecting surface 3d against which the contrast spring 5 mates.

The spherical elements 25 are held in place by a cage 9. In some embodiments, the cage 9 may be held in place by a spring. In other embodiments (such as the one shown in the figures), such a spring is not necessary.

Figure 4:
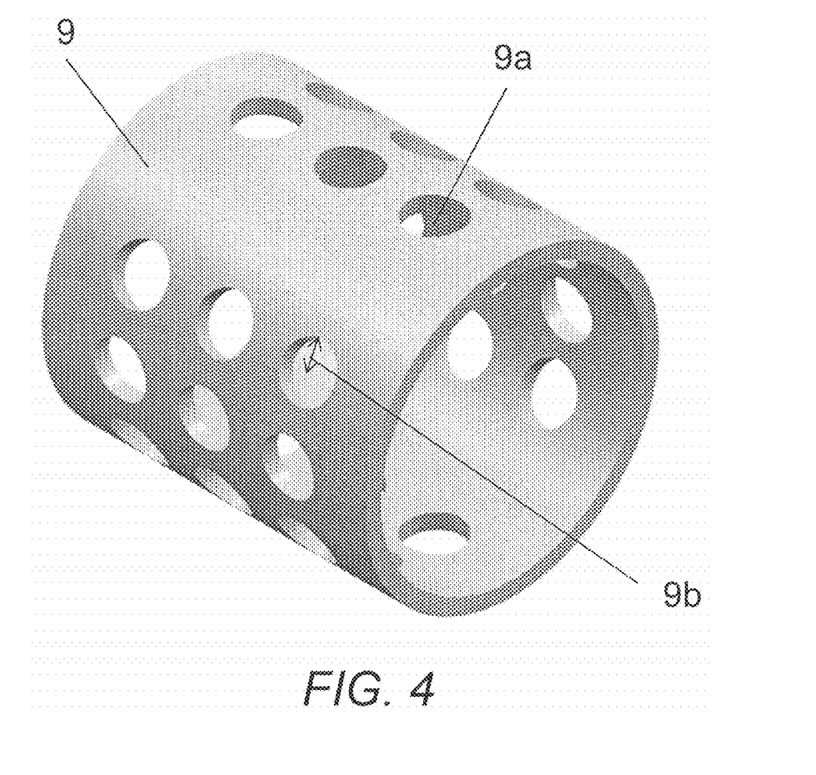
FIG. 4 is a perspective view of a cage for use in an embodiment of an actuator.
Figure 5:
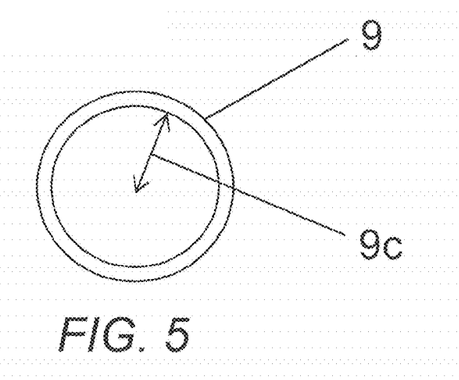
FIG. 5 is an end view the cage of FIG. 4.

The cage 9 is illustrated more clearly in FIGS. 4 and 5. The cage 9 is a cylindrical sleeve with a plurality of circular apertures 9a provided therein.

The number of apertures 9a provided in the cage 9 equals or exceeds the number of spherical elements 25 such that an (at least one) aperture 9a is provided for each rolling element 9. The apertures 9a are positioned so as to hold the spherical elements 25 in the grooves 4. Thus, the apertures 9a are arranged in rows corresponding to each groove 4, each row containing the same (or more than the) number of apertures 9a as there are spherical elements 25 provided in that groove 4.

The radius 9b of each aperture 9a (as indicated in FIG. 4) is slightly larger than the radius 25a of each spherical element 25. This means that the apertures 9a can act to axially retain the spherical elements 25 in the grooves 4.

The cage 9 has a radius 9c (as indicated in FIG. 5), which is larger than that of the input shaft 2 and less than that of the sliding collar 3. In this way, the cage 9 fits between the input shaft 2 and the sliding collar 3. The cage 9 is slightly longer than the grooves 4.

During assembly, grease is provided in each groove 4 to help keep the spherical elements 25 within the grooves 4 before the cage 9 is positioned around them.

In the embodiment shown, all of the components of the actuation system 1 described are made of steel, with the exception of the housings 12 and 13, which are made of aluminum. However, other materials may alternatively be used.

The spherical elements 25 allow the sliding collar 3 to move axially relative to the input shaft 2 and the output shaft 7, thereby allowing the sliding collar 3 (via its radially projecting surface 3d) to compress the spring 5, axially disengaging the ramps 3b and 7b, as described below.

FIGS. 3(a) and (b) are schematic diagrams illustrating the torque transmission process and the functioning of the torque-limiting sensing elements. In these figures, the parts shown rotate about a horizontal axis.

As illustrated in these figures, interlocking frontal teeth 3a, 7a are provided on the sliding collar 3 and on the output shaft 7, respectively. Each of these interlocking teeth 3a, 7a, has two sloping sides providing helical ramps 3ba, 3bb, 7ba, and 7bb, respectively. Pairs of helical ramps 3ba, 7ba or 3bb, 7bb (depending on the direction of rotation of the input torque), mate with each other, allowing torque to be transmitted from the sliding collar 3 to the output shaft 7.

The helical ramps 3ba, 3bb, 7ba and 7bb each have an angle with respect to the direction normal to the tangential force from the applied (input) torque TA, such that whenever a torque is transmitted, an axial force component is generated which tends to separate the sliding collar 3 and the output shaft 7. Thus, the axial loading force on the spring 5 is caused by the transmission of torque between a helical ramp 3ba or 3bb on the sliding collar 3 and the corresponding helical ramp 7ba or 7bb, respectively, on the output shaft 7.

When the input (applied) torque TA exceeds a certain threshold, this generated axial force component exceeds a preload force FS of the spring 5 (which force pushes the teeth 7a and 3a together, via the radially extending surface 3d or the sliding collar 3) such that a relative rotation occurs between the sliding collar 3 and the output shaft 7, resulting in an axial sliding movement of the sliding collar 3 on a mating surface (helical ramp) 7ba or 7bb (depending on the direction of rotation of the input torque, i.e. clockwise or anti-clockwise) of the output shaft 7. This sliding movement eventually results in a relative angular displacement between the sliding collar 3 and the output shaft 7, whereby the teeth 7a and 3a are no longer engaged and torque is no longer transmitted from the input shaft 2, via the sliding collar 3, to the output shaft 7. Thus, the transmission of excessive input torques (i.e. above a certain activation threshold) from the input shaft 2 to the output shaft 7 is prevented.

This movement of the output shaft 7 also causes one of the two no-back springs 22a or 22b (depending on the rotational direction of the input torque, i.e. clockwise or anti-clockwise) to be engaged via a projection tooth 23b and enlarged and locked in a seat 6a in the housing 6 (as illustrated in FIG. 9), so as to obtain a required braking function of the input shaft 2. In other words, when the torque limiting function is activated (preventing transmission of torque from the input shaft 2 to the output shaft 7) a no-back spring 22a or 22b is also engaged, thereby acting as a brake on the input shaft 2.

Thus, when the input torque exceeds a certain activation threshold, the torque-limiting device is activated preventing transmission of the input torque from the input shaft to the output shaft 7. In addition, the input torque is grounded to the housing 6 through one of the logarithmic no-back springs 22a and 22b, depending on the direction of rotation of the input torque.

Once the spring 22a or 22b is locked inside its seat 6a in the housing 6 in this way, the only way to unlock the spring 22a or 22b is to reverse the (rotational) motion of the input shaft 2. The torque-limiting device automatically disengages (i.e. stops limiting the transfer of torque) when the input torque is reversed. When the input torque is reversed in its rotational direction, the sliding collar 3 rotates in the opposite direction resulting in its teeth 3a re-engaging with the teeth 7a of the output shaft, thereby allowing the input torque to be transmitted to the output shaft 7.

The angle(s) of the helical ramps 3ba, 7ba and 3bb, 7bb with respect to the direction normal to the tangential force from the applied (input) torque TA can be selected so as to provide a desired activation threshold of the torque limiting device, i.e. to set at which input torque the torque limiting device would be activated. As different ramps 3ba, 7ba and 3bb, 7bb are involved in this function depending on the rotational direction of the input torque, the angles may be set differently to provide different activation thresholds of the torque limiting device for the two different rotational directions, if desired. Alternatively, the angles may be the same. However, each pair of corresponding ramps 3ba, 7ba, and 3bb, 7bb, should have the same angle to ensure smooth mating.

With regards to external loads on actuators (e.g. a ballscrew type actuator as illustrated in FIG. 1), these can be tension or compression loads. The output shaft 7 is normally geared to a wormwheel 26 that is normally splined (installed) on the nut of a ballscrew (not shown). As a result, external loads applied to the ballscrew are transferred to the output shaft 7 through the wormwheel 26, and can cause clockwise or anti-clockwise rotation of the output shaft 7 (and, as a consequence, of the input shaft 2) unless a no-back device is provided. The two no-back springs 22a and 22b act to prevent such clockwise and anti-clockwise rotation, respectively, of the output shaft 7 as a result of external loads.

Thus, a braking function against excessive external loads is also provided by the logarithmic no-back springs 22a and 22b. When an external load is transmitted from the output shaft 7 to the input shaft 2, the rectangular cross-section coils of one of the two no-back springs 22a or 22b (depending on the rotational direction of the torque from the external load, i.e. clockwise or anti-clockwise) are enlarged in their seat 6a and lock with the housing 6, which is firmly fitted within the actuator body (housing) 13, so preventing the reversibility of the actuator (i.e. torque being transmitted back to the input shaft 2). This enlarged and locked state of a no-back spring 22a is illustrated in FIG. 9.

As discussed above and shown in FIG. 2, there are two no-back springs 22a and 22b. One no-back spring 22a brakes (locks) when an external load acts in compression (retraction) and the other one 22b brakes (locks) when the external loads acts in tension (extension). The no-back spring 22a performs the no-back function of preventing the input shaft 2 from rotating in an anti-clockwise direction. The other no-back spring 22b prevents rotation caused by external loads in a clockwise direction.

When they are released, the no-back springs 22a and 22b rotate with minimum drag torque. When they are activated, the no-back springs 22a and 22b develop a very large braking torque ($T_B$), which is a linear function of its preload torque ($T_0$) and an exponential function of the number of coils (N) and of the friction factor (f) of the spring, as defined by:

$$T_B = T_0 e^{2\pi N f}$$

FIG. 11 is a graph comparing the performance of a torque-limiting device according to an embodiment of the invention with that of a prior art torque-limiting device. The dashed line 31 shows the torque-limiter "setpoint" (the torque value in Nm at which the torque-limiter is activated) as a function of external torque rate for a prior art torque-limiter (i.e. without such rolling elements provided between the sliding collar and the input shaft). The solid line 30 shows the torque-limiter "setpoint" as a function of external torque rate for a torque-limiter with rolling elements according to an embodiment of the present invention.

As can been seen from the graph, the setpoint for the prior art torque-limiter varies as a function of torque rate. However, for the torque-limiter according to the embodiment of the present invention, the setpoint is nearly constant as a function of torque rate, as the torque rate varies between 5 and 45 Nm/s, i.e. the torque-limiter is nearly insensitive to the torque rate. The difference between minimum and maximum setpoint for the torque-limiter according to the present invention is around 10% while the normal dispersion for prior art torque limiters can be greater than 30%.

What is claimed is:

1. An actuator comprising:
an input shaft;
a sliding collar arranged around the input shaft;
an output shaft, wherein the input and output shafts and sliding collar being arranged such that a torque applied to the input shaft can be transmitted via the sliding collar to the output shaft; and
a torque-limiting device for limiting the transmission of the torque between the input shaft and the output shaft if the torque exceeds a certain threshold, wherein the torque-limiting device comprises one or more rolling elements arranged between the sliding collar and the input shaft to allow the sliding collar to move axially relative to the input shaft and engage with or disengage from the output shaft;
wherein:
at least one of the input shaft and the sliding collar comprises along at least part of its length one or more pits or grooves in which the one or more rolling elements are arranged;
the actuator further comprises a retaining member around the input shaft and one or more rolling elements;
the retaining member has one or more apertures provided therein and the one or more apertures are positioned so as to hold the one or more rolling elements in the one or more pits or grooves; and
wherein the sliding collar and output shaft each comprise one or more corresponding helical ramps.

2. An actuator as claimed in claim 1, wherein the one or more rolling elements are spherical.

3. An actuator as claimed in claim 1, wherein a plurality of rolling elements are provided in each pit or groove.

4. An actuator as claimed in claim 1, comprising a plurality of pits or grooves.

5. An actuator as claimed in claim 4, wherein the pits or grooves are spaced evenly around at least one of the circumference of the input shaft and an inner surface of the sliding collar; or the pits or grooves are provided in two or more groups or clusters around the circumference of the input shaft and around an inner surface of the sliding collar.

6. An actuator as claimed in claim 1, wherein the one or more rolling elements and one or more pits or grooves are dimensioned so as to at least partially fit each other.

7. An actuator as claimed in claim 1, wherein the depth of each pit or groove is equal to the radius or half the height of the one or more rolling elements.

8. An actuator as claimed in claim 1, wherein each pit or groove has a radius of curvature equal to or larger than the radius of the one or more rolling elements.

9. An actuator as claimed in claim 1, wherein the retaining member is held in position with one or more resilient members.

10. An actuator as claimed in claim 1, further comprising a no-back device.

11. An aircraft comprising an actuation system with at least one actuator as claimed in claim 1.

12. A method of manufacturing an actuator, the method comprising:
provided an input shaft, a sliding collar, and an output shaft, wherein at least one of the input shaft and the sliding collar comprises along at least part of its length one or more pits or grooves in which one or more rolling elements are arranged;
positioning the sliding collar around the input shaft;
arranging the input and output shafts and sliding collar such that a torque applied to the input shaft can be transmitted via the sliding collar to the output shaft; and
providing a torque-limiting device for limiting the transmission of the torque between the input shaft and the output shaft if the torque exceeds a certain threshold;
wherein the torque-limiting device comprises the one or more rolling elements arranged between the sliding collar and the input shaft to allow the sliding collar to move axially relative to the input shaft and engage with or disengage from the output shaft, and the sliding collar and output shaft each comprises one or more corresponding helical ramps;
the method further comprising:
providing a retaining member around the input shaft and one or more rolling elements, wherein the retaining member has one or more apertures provided therein and the one or more apertures are positioned so as to hold the one or more rolling elements in the one or more pits or grooves.

* * * * *